Jan. 30, 1962 M. W. NOALL, JR 3,018,822
TIRE SIPING MACHINE
Filed March 25, 1959 5 Sheets-Sheet 1

Jan. 30, 1962  M. W. NOALL, JR  3,018,822
TIRE SIPING MACHINE
Filed March 25, 1959  5 Sheets-Sheet 3

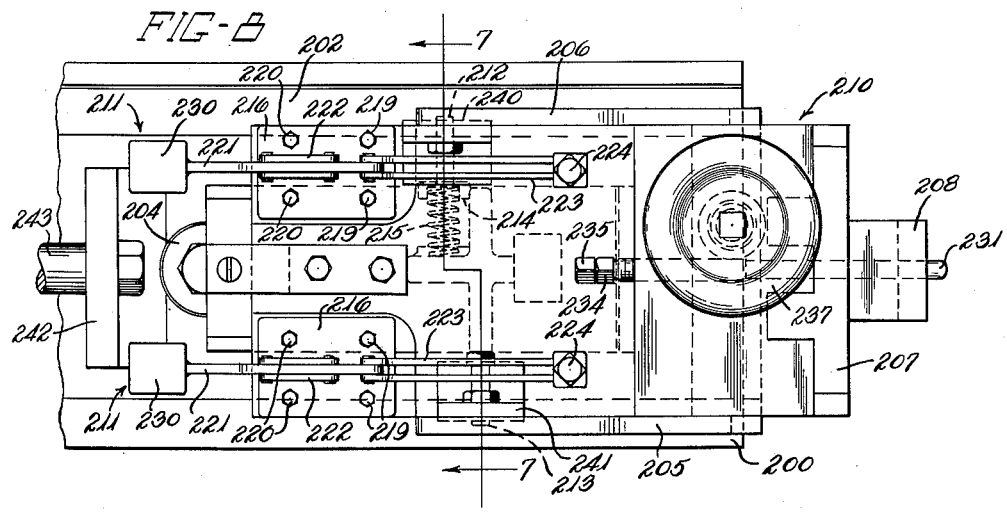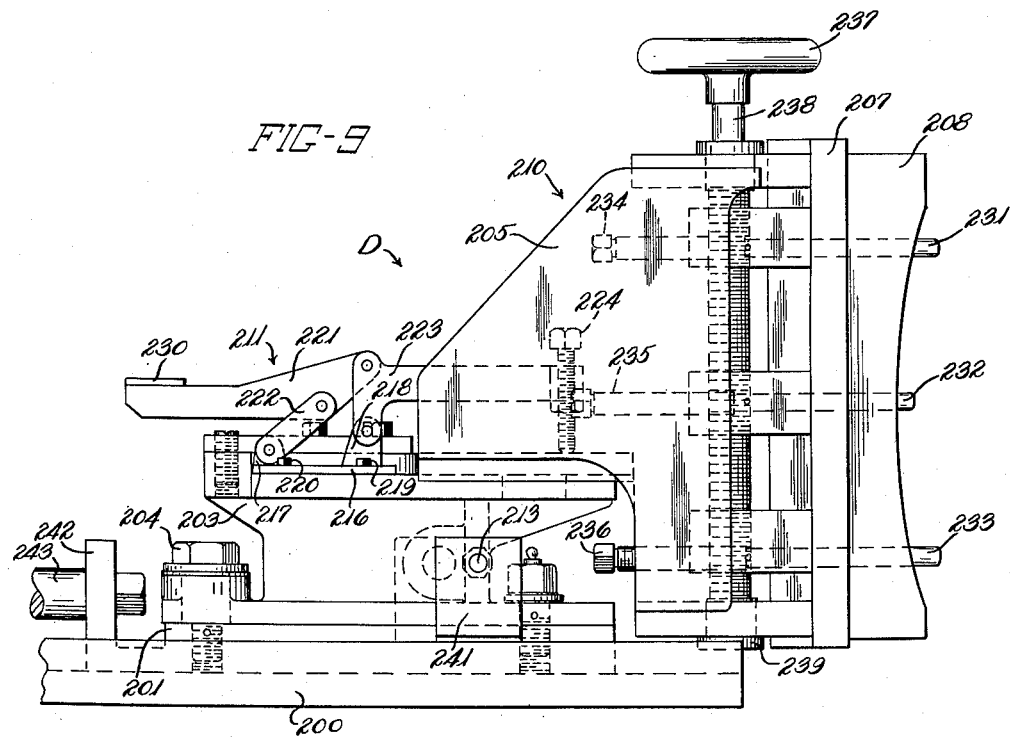

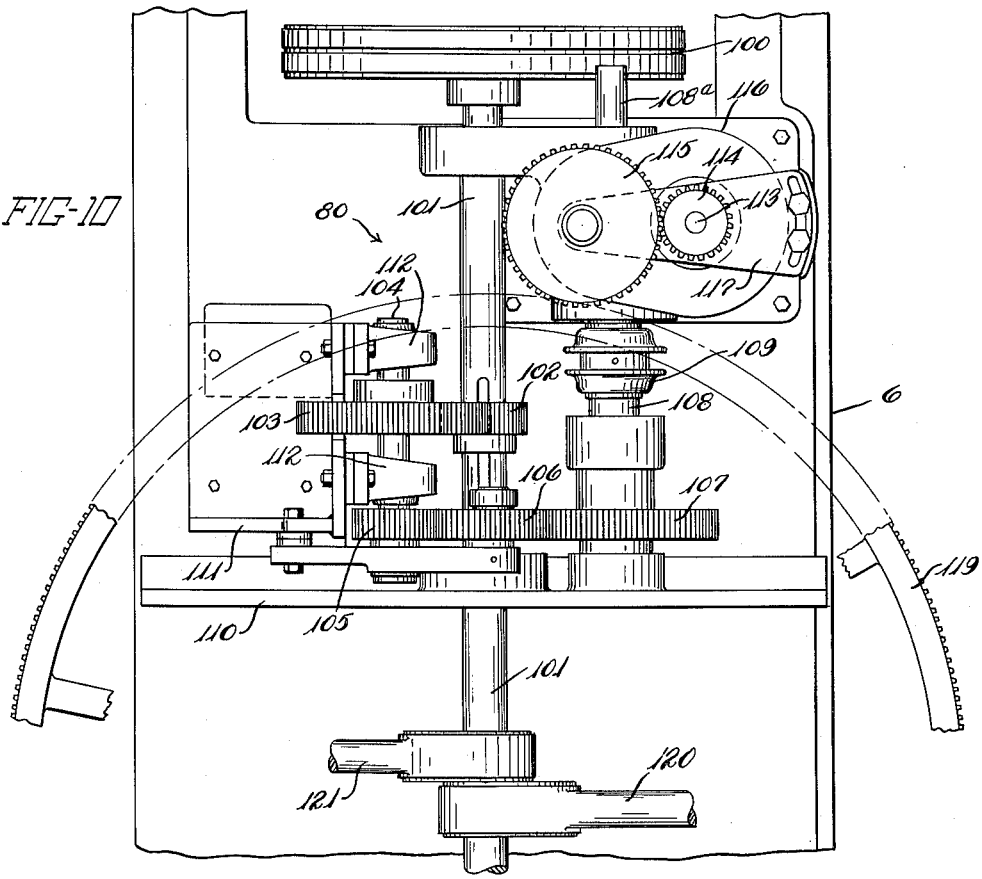
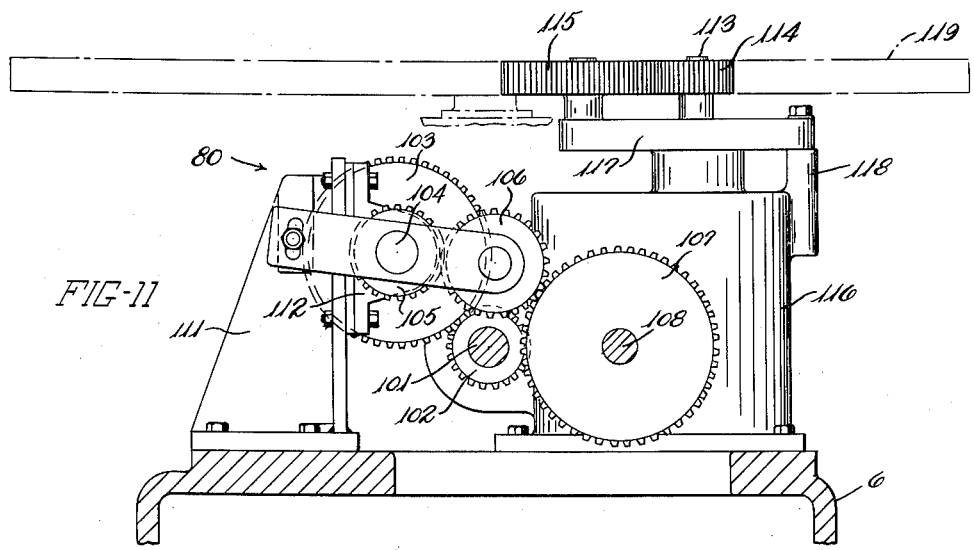

United States Patent Office 3,018,822
Patented Jan. 30, 1962

3,018,822
TIRE SIPING MACHINE
Michael W. Noall, Jr., Cuyahoga Falls, Ohio, assignor to The Firestone Tire & Rubber Company, Akron, Ohio, a corporation of Ohio
Filed Mar. 25, 1959, Ser. No. 801,826
7 Claims. (Cl. 157—13)

The present invention relates to means for siping pneumatic tires and more particularly to a novel method and apparatus for simultaneously rotating a tire while cutting sipes in the tread.

A tire tread is siped to prevent skidding on the road. The siping operation is normally performed by cutting slits in the tread, turning the tire so that an uncut surface of the tread faces the knives and cutting additional sipes and continuing this operation until the entire tread surface is cut. This operation is intermittent and slow and the present invention overcomes this failing of the prior art by siping the tire continuously as it is rotated.

The primary object of the present invention is to provide means for siping a tire tread while the tire is being continuously rotated about its axis. A further object of the invention is to provide apparatus for simultaneously rotating a tire about its axis and, in timed relation to said rotation, cutting sipes in the tread. Yet another object of the invention is to provide a siping machine wherein the tire is rotated about its axis while siping knives are plunged point first into the tread without stopping rotation of the tire. Yet another object of the invention is to provide apparatus for permitting a siping knife to move with a tire as it is rotated about its axis.

These and other objects of the invention may be more readily understood by reference to the specification, claims and drawings of which:

FIGURE 8 is a plan view of the siping head of the invention.

FIGURE 9 is a side elevation of the siping head of FIGURE 8.

FIGURE 10 is a fragmentary plan view of the apparatus of the invention with top components removed to show the details of the continuous drive.

FIGURE 11 is a fragmentary side elevation partially in section of the apparatus of FIGURE 10 with parts removed to show a portion of the continuous drive mechanism.

Figure 1:
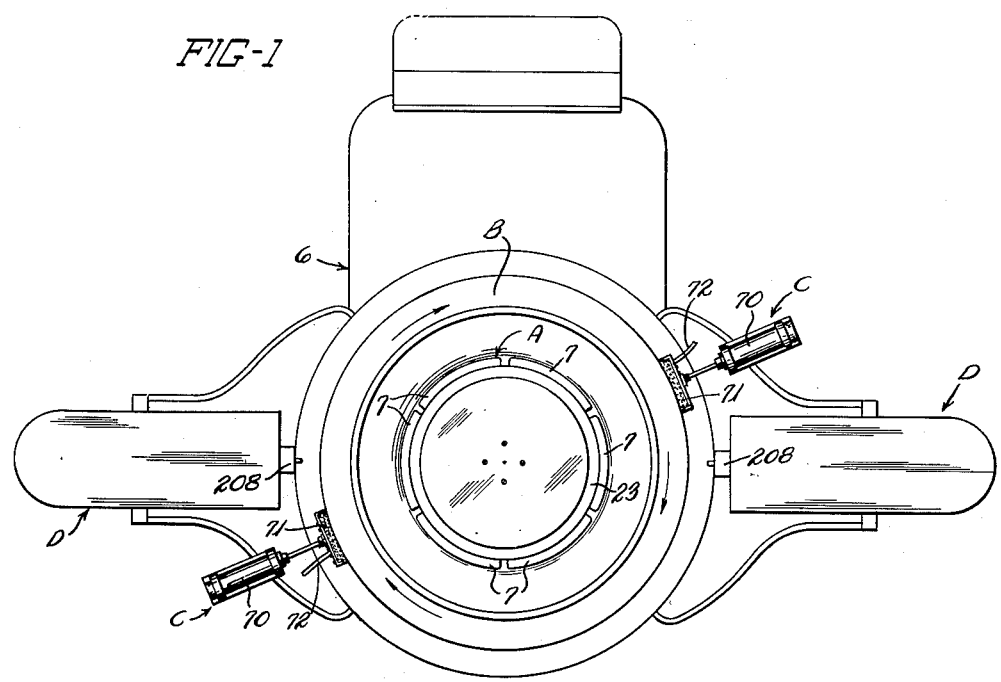
FIGURE 1 is a plan view of the apparatus of the invention.

Referring to the drawings the apparatus is comprised of a stand 6 mounting a quick acting tire chuck A upon which a tire B may be mounted. A continuous motion assembly turns chuck A and simultaneously reciprocates the knives of siping head assemblies D into contact with the tire tread. Lubricating assembly C floods the surface of the tread with water to lubricate the knives.

*Quick acting tire chuck*

Figure 3:
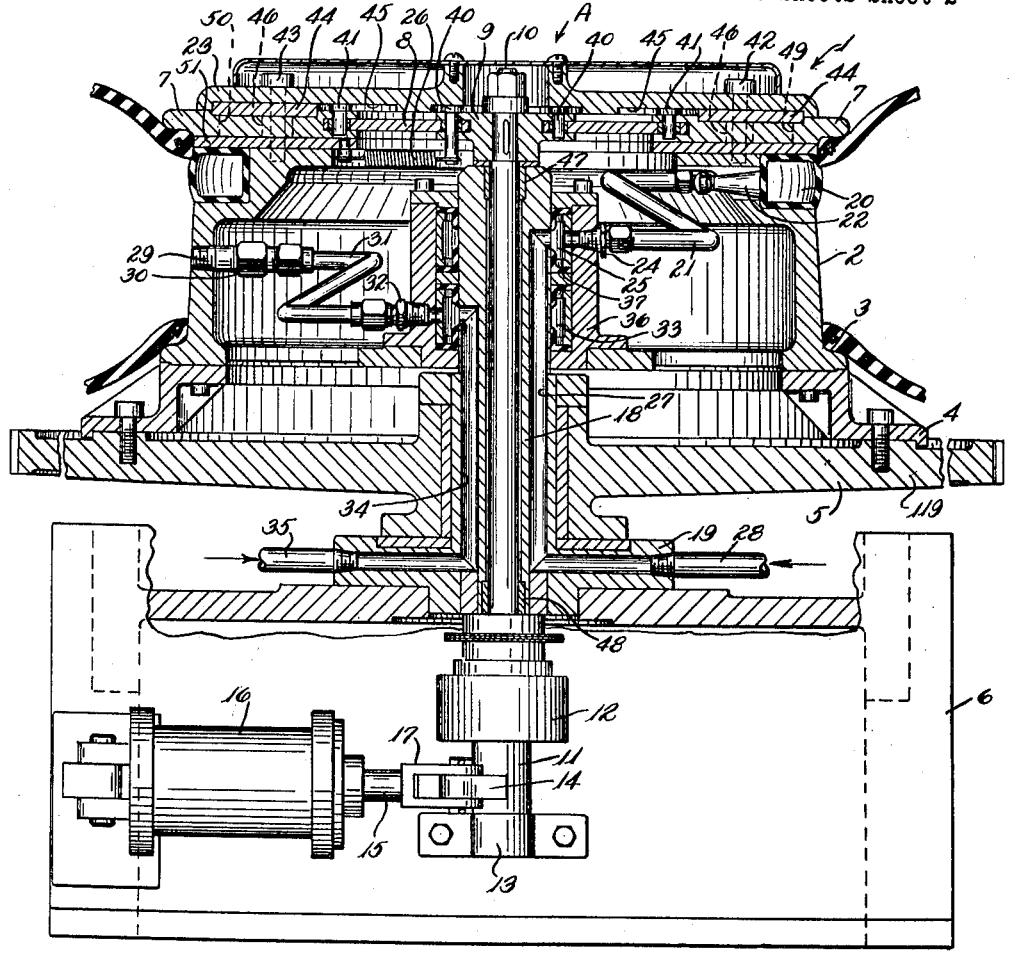
FIGURE 3 is a sectional view of the expansible tire mounting chuck used in the invention.

With reference to the drawings and particularly FIGURE 3, an adjustable chuck generally indicated at A comprises an annular base 2, having an annular tire bead supporting flange 3 mounted on an adapter ring 4 which is supported by ring gear 119 (FIGURE 10) resting on stand 6.

Six segmented bead holders 7 (FIGURE 1) are mounted between top plate 23 and ring 51 and adapted for radial movement through attachment on the radial inner edge to link 8 by pivot pin 41. The other end of link 8 is attached by pivot pin 40 to center flange 9, which is adapted for rotation with shaft 10. The shaft 10 is actuated by a chain and sprocket assembly fixed to shaft 11, having its upper portion in bearing 12 and its lower end in bearing 13, and is rotated by the action of air cylinder 16 having piston rod 15 which pivots lever arm 14 attached to clevis 17 at one end and to shaft 11 at the other end.

Shaft 10 is mounted in, and supported by bearings 47 and 48 in center post 18 which has a base 19 resting on a portion of stand 6.

For sealing the upper bead of the tire an annular inflatable member 20 is retained within recess in base 2 and is adapted for inflation through a valve 22 connected with air hose 21 communicating with an annular chamber 25 through fitting 24. The chamber 25 is gasketed against the escape of air by two annular leather seals such as 37 and communicates with a passage 27 running down center post 18 and through base 19 to air pipe 28 connected to a source of high pressure air not shown.

For inflating the tire the base 2 receives nipple 29 attached to fitting 30 and air hose 31 having a fitting 32 at its other end in body 36. A second annular chamber 33 communicates with fitting 32 and passage 34 which, in turn, is connected to pipe 35 of another high pressure air line. It will be seen that pipe 28 through its associated connections makes possible the inflation of the inflatable member 20 while pipe 35, through its associated connections, makes possible the inflation of the tire.

Referring to FIGURES 1 and 3, the device has six bead holders, such as 7, attached to the shaft 10 through links 8 and center flange 9. Each bead holder 7 has two slots 49 and 50 which permit substantial radial movement of the bead holder with respect to screws 42 and 43 mounting bushings 46, which anchor top plate 23 to the annular base 2. Each bead holder 7 is held in position with respect to the top plate 23 by a key 44 which is shorter than a key way in top plate 23 to permit it to ride therein as the bead holder moves radially. Three springs are each attached at one end to the ring 51 and at the other end to a pin 40 on center flange 9 to resiliently position the various parts as the shaft 10 is twisted.

It will be seen that as the air cylinder 16 is actuated, shaft 10 is twisted to pivot center flange 9 with respect to the arms 8 so that the bead holders 7 are drawn radially inward with the keys 44 and the bushings 46 on screws 42 and 43 sliding in their respective slots to keep the bead holders in alignment.

In operation of the chuck assembly, the action of air cylinder 16 twists shaft 10 to rotate flange 9 and, in effect, shorten arms 8, drawing the six bead holders 7 radially inwardly to form a segmented disc of a diameter less than the diameter of the bead of the tire B. The tire is then slipped axially over the bead holder 7 and onto base 2 so that the lower bead is seated against flange 3. Air cylinder 16 is then actuated in the reverse sense to twist shaft 10 in the opposite direction to rotate flange 9 and, in effect, lengthen arms 8 to move the six bead holders 7 radially outwardly.

In this position the six bead holders are spaced circumferentially from each other with portions on their lateral faces separated by gaps (FIGURE 1). This structure would permit escape of inflation air from a tire if it were not for inflatable member 20 (FIGURE 3). Through appropriate controls not shown, air at about 30 p.s.i. is introduced slowly through pipe 35, passage 34 and air hose 31 into the tire cavity to inflate the tire and force the tire beads axially against flange 3 and the bead holders 7. Air also is introduced through pipe 28, passage 27 and air hose 21 into member 20, which is expanded against the toe of the bead of the tire which has seated against bead holder forming a circumferential seal completely around the bead. The siping operation is then performed after which the inflation air is permitted to escape through hose 31, the member is deflated through hose 21, air cylinder 16 is actuated to twist shaft 10 in the reverse sense to move bead holder 7 radially inwardly and the tire is lifted axially from the chuck to complete the operation.

*The continuous motion assembly*

Referring to FIGURES 10 and 11, the continuous motion drive generally indicated at 80 comprises a belt driven pulley 100 keyed to shaft 101 journaled in side plate 110 and mounting spur gear 102 meshed with another spur gear 103. Gear 103 is keyed to and turns jack shaft 104 supported by bearings 112 mounted on bracket 111 and thereby drives spur gears 105, 106 and 107, the latter gear driving shaft 108. Coupling 109 joins shaft 108 to a second shaft 108-A through conventional gears (not shown) in gear case 116 to thereby drive shaft 113, spur gear 114 and spur gear 115. The last-named gears are mounted on support 117 by arm 118 on the gear case 116. Gear 115 meshes with and drives ring gear 119 upon which is mounted the tire chuck assembly generally indicated at A. Shaft 101 extends through sideplate 110 (FIGURE 10) to mount connecting rods 120 and 121 which are pivotedly attached at 124 and 125 to slides 122 and 123 respectively supported by slide ways 126 and 127. The arrangement of structure makes it possible by turning pulley 100 by conventional means to rotate ring gear 101 and thereby the tire chuck assembly while simultaneously reciprocating slides 122 and 123 in ways 126 and 127.

*Siping head assembly*

Figure 7:
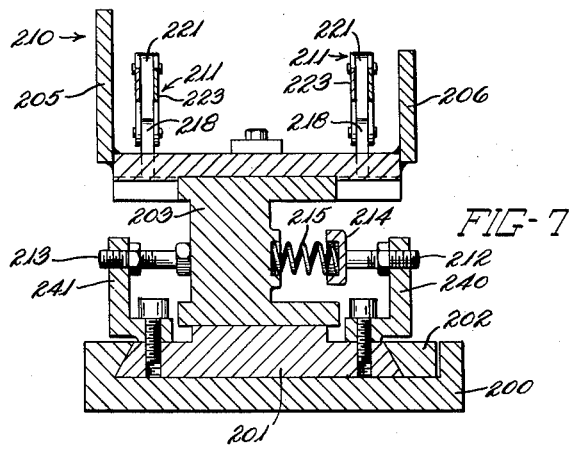
FIGURE 7 is a sectional view taken along line 7—7 of FIGURE 8.

The siping head assemblies generally indicated at D—D (FIGURE 1) are best shown in FIGURES 7, 8 and 9 wherein each slideway 200 supports a slide base 201, which is dove-tailed in section and spaced from the side of slideway 200 by spacer 202. Slide base 201 frictionally supports swivel bracket 203 pivoted thereon by pin 204. The latter bracket supports the knife head generally indicated at 210 having side plates 205 and 206 and front plate 207 supporting knife mounting bracket 208. The knife head 210 is secured to the swivel bracket by two clamp assemblies to be described.

The swivel bracket 203 pivots about pin 204 a distance or "throw" which is determined by the position of two set screws, 212 and 213, supported by brackets 240 and 241 respectively. Set screw 212 terminates at its inner end in spring seat 214 which receives one end of spring 215 seated at its other end in a recess in swivel bracket 203.

Since the two clamp assemblies, 211—211 are identical, only one assembly need be described. Referring to FIGURES 3 and 9, base plate 216 mounting two ears 217 and 218 is anchored to the swivel bracket 203 by screws such as 219 and 220. Arm 221, mounting plate 230, is pivoted to link 222 and arm 223 while link 222 is pivoted on ear 217 and arm 223 is pivoted on ear 218. Set screw 224 is mounted on the free end of arm 223 and abuts against the base of knife head 210.

Knife mounting bracket 208 is provided with three slots from which protrude siping knives 231, 232 and 233 abutting against and secured to permit relative rotation between the knife ends and the ends of set screws 234, 235 and 236. Hand wheel 237 mounted on helically threaded rod 238 having a head 239 provides for vertical adjustment of the knife head 210 while manipulation of screws 234, 235 and 236 adjusts the knives horizontally.

Figure 2:
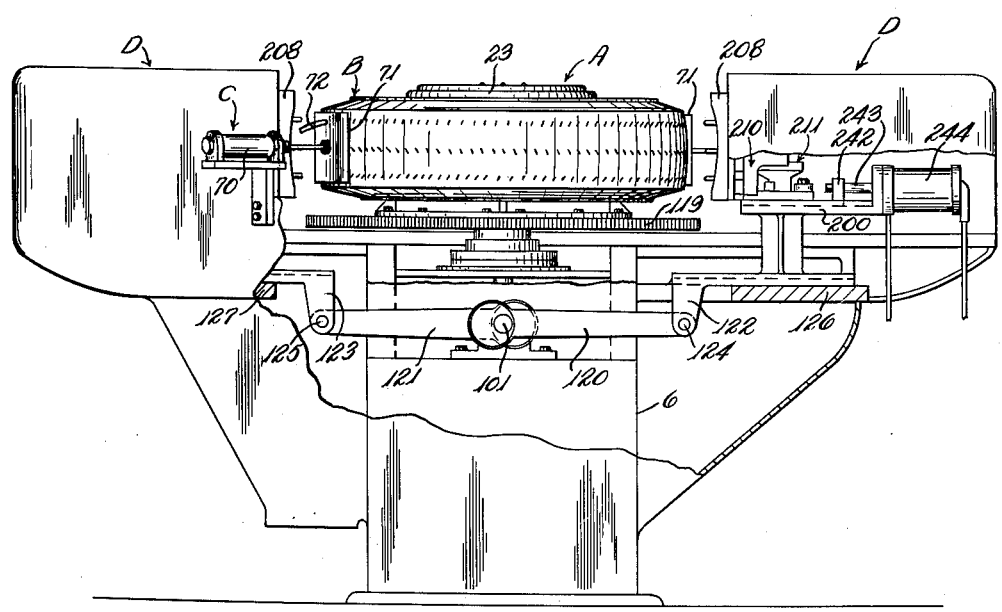
FIGURE 2 is a side elevation of the apparatus of FIGURE 1 partially broken away to show component parts of the apparatus of the invention.

To provide for retraction of the knife head to a standby position while tires are being mounted on or removed from the chuck, slide 201 is provided on one end with lug 242 to which is bolted the end of piston rod 243 operated by air cylinder 244 (FIGURE 2) mounted on slide base 200. Extension and retraction of piston rod 243 is accomplished by air entering and leaving the cylinder.

*Tire lubricating assembly*

Two tire lubricating assemblies generally indicated at C—C (FIGURES 1 and 2) are used to supply a continuous supply of water or other solution to the tread to lubricate the siping knives. These assemblies comprise air cylinders 70 to actuate the lubricating assemblies into or out of contact with the tire tread. Lubricant is provided to sponges 71 through hoses 72 from a water supply not shown.

*Operation*

In operation of the invention a tire B is centered on inflatable chuck A and the chuck expanded as previously described to seal the tire beads while the tire is inflated.

Figure 4:
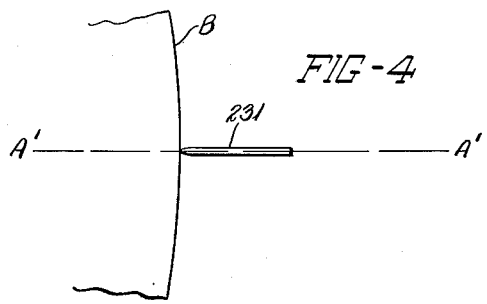
FIGURE 4 is a schematic view of a siping knife of the invention about to penetrate a tire tread.
Figure 6:
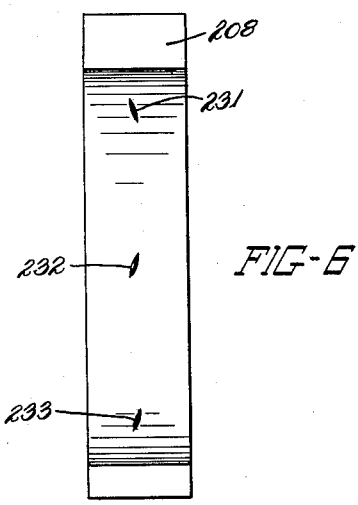
FIGURE 6 is an end view of the knife-head of the invention.
Figure 5:
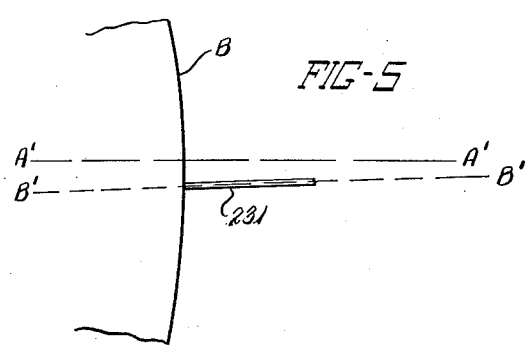
FIGURE 5 is a schematic view of knife of the invention penetrating and turning with the tire tread.

Pulley 100 (FIGURE 10) is driven by a motor not shown to rotate shaft 101 and thereby ring gear 119 through the gear arrangement shown in FIGURE 10. Also and simultaneously, shaft 101 drives connecting rods 120 and 121 to reciprocate those rods and slides 122 and 123 respectively in slide ways 126 and 127. This action reciprocates the siping head assemblies D—D with respect to the rotating tire tread so that knives 231, 232 and 233 pierce the tread to form the desired sipe cuts. The knives are lubricated by water flooding the surface of the tire tread from tire lubricating assembly C. Since the tire is rotating when the knives 231, 232 and 233 pierce the tread, it will be seen that the knives will be turned from their original line of entry as the tire is turned. This action is shown sequentially in FIGURES 4 and 5. In FIGURE 4, knife 231 prepares to enter the tire tread along a line of entry A'—A'. The rotation of the tire carries the knife 231 to a new position with respect to line A'—A' as shown by line B'—B' in FIGURE 5. Obviously knife 231 must either turn with the tire or be broken. The knife is permitted to turn with the tire because it is mounted in knife head 210 supported by swivel bracket 203 pivoted on pin 204 (FIGURE 8). As the knife is forced from the line A'—A' of FIGURE 4 to the position of B'—B' (FIGURE 5), the entire knife head 210 and bracket 203 pivot around pin 204 against spring 215. Bracket 203 slides on base 201. Subsequently as the knife is withdrawn from the tire because of the reciprocation of connecting rods 120 or 121, spring 215 returns bracket 203 to position so that knife 231 is again in the position A'—A' shown in FIGURE 4. As a practical matter, because of the short "throw" of the connecting rod with respect to shaft 101, the knives are reciprocated with respect to the tire tread at a high rate of speed so that bracket 203 is being returned to its initial position by spring 215 many times per minute.

Upon completion of the siping operation the motor drive (not shown) of pulley 100 is stopped and inflatable chuck A is collapsed, and the tire B deflated for removal from the chuck. To facilitate removal of the tire, air cylinder 244 is activated by controls (not shown) to retract piston rod 243 to draw slide base 201 with the complete siping head assembly 210 radially away from the tire. Cylinders 70 are actuated to withdraw lubricating sponges 71 from the tire. After a new tire is mounted and inflated on the chuck, air cylinder 244 is actuated to extend piston rod 243 and slide the base 201 with the knife head assembly 210 radially into cutting position with respect to the tire (FIGURE 4). Cylinders 70 are then actuated to bring sponges 71 into contact with the tire. Pulley 100 is then actuated and the siping operation is repeated.

In adjusting or repairing the apparatus, the knife head 110 may be replaced by releasing clamps 211 by pivoting arms 221 upwardly with respect to arms 222 and 223. This raises set screw 224 so that the knife head 210 can be withdrawn from the knife bracket 203 and replaced. The amount of "throw" of the bracket 203 and knives 231, 232 and 233 with respect to the tire A can be adjusted by manipulating set screws 212 and 213 to compress or relax spring 215. Vertical adjustment of knife head assembly 210 is attained by manipulating hand wheel 237 and thereby helically threaded rod 238 and mounting cap 239. The length of extension of the knives with respect to the mounting bracket 208 may be set by manipulation of set screws 234, 235 and 236.

While certain representative embodiments of the invention have been shown by way of illustration, it will be apparent to those skilled in the art that various changes and modifications may be made therein without departing from the spirit or scope of the invention.

What is claimed is:

1. An apparatus for siping a tread of a tire as it continuously rotates about its axis comprising means for mounting the inflated tire, cutting means mounted adjacent said mounting means and adapted for movement towards and away from the tread surface, means connected to said mounting means and to the cutting means and adapted to rotate said tire about its axis and simultaneously to reciprocate said cutting means into and out of contact with said tread and means connected to said cutting means for reciprocating said cutting means in the plane of rotation of said tire.

2. An apparatus for siping a tread of a tire as it continuously rotates about its axis comprising means for mounting the inflated tire, cutting means mounted adjacent said mounting means and adapted for movement towards and away from the tread surface, means connected to said mounting means and to the cutting means and adapted to rotate said tire about its axis and simultaneously to reciprocate said cutting means radially with respect to the tire into and out of contact with said tread.

3. An apparatus for siping a tread of a tire as it continuously rotates about its axis comprising means for mounting an inflated tire for rotation about its axis, a cutting means carriage mounted adjacent said mounting means and adapted for movement towards and away from the tread surface, a cutting means reciprocably positioned on said carriage, means connected to said mounting means and to the cutting means and adapted to rotate said tire about its axis and simultaneously to reciprocate said cutting means radially with respect to the tire into and out of piercing contact with said tread, and means mounted on said cutting means carriage adapted to move said carriage radially with respect to the tire at the beginning and end of the siping operation.

4. An apparatus for siping a tire tread while the tire is rotating about its axis comprising a tire mounting chuck for mounting the inflated tire, cutting means adjacent said mounting chuck and adapted to pierce and be withdrawn from the tire tread, said cutting means being pivoted to travel with the tire tread during the piercing operation, drive means connected to said chuck and to said cutting means and adapted to rotate said chuck and to reciprocate said cutting means in timed relation to rotation of the chuck so that the cutting means pierces the tread as it travels with the rotating tire tread and means for returning said cutting means in a counter-rotational movement to its original position for the next piercing operation.

5. An apparatus for siping a tire tread while the tire is rotating about its axis comprising a tire mounting chuck for mounting the inflated tire, a slideway mounted substantially radially to the tire, a slide mounted for reciprocating movement in the slideway, a bracket pivotedly mounted on the slide and adapted to pivot in a plane transverse the axis of the tire, a cutting member protruding from the bracket and adapted to pierce the tire tread as the slide moves forward in the slideway, a connecting rod pivotedly connected to the slide, and power driven means attached to said chuck and adapted to turn it about its axis and also connected to the connecting rod and adapted to reciprocate the slide in the slideway in timed relation to said rotation.

6. An apparatus for siping a tire tread while the tire is rotating about its axis comprising a tire mounting chuck for mounting the inflated tire, a slideway mounted substantially radially to the tire, a slide mounted for reciprocating movement in the slideway, a bracket pivotedly mounted on the slide and adapted to pivot in a plane transverse the axis of the tire, a cutting member protruding from the bracket and adapted to pierce the tire tread as the slide moves forward in the slideway, a connecting rod pivotedly connected to the slide, power driven means attached to said chuck and adapted to turn it about its axis and also adapted to reciprocate the slide in the slideway in timed relation to said rotation, and an air cylinder mounted on said slide and attached to said bracket and adapted to withdraw said bracket radially from the tire after the siping operation is complete.

7. A method of cutting a sipe in a tire comprising the steps of rotating the tire about its axis, piercing the tire tread with the point of a knife while the tire continues to rotate and simultaneously turning the knife in the direction of rotation of the tread, withdrawing the knife from the rotating tread, and repositioning the knife in its original position in preparation for cutting another sipe.

References Cited in the file of this patent

UNITED STATES PATENTS

| | | |
|---|---|---|
| 1,521,238 | Gammeter | Dec. 30, 1924 |
| 1,628,817 | Wilson et al. | May 17, 1927 |
| 2,000,129 | Dunnam | May 7, 1935 |
| 2,086,020 | Errig et al. | July 6, 1937 |
| 2,133,438 | Eger | Oct. 18, 1938 |
| 2,891,605 | Love | June 23, 1959 |

UNITED STATES PATENT OFFICE
CERTIFICATE OF CORRECTION

Patent No. 3,018,822  January 30, 1962

Michael W. Noall, Jr.

It is hereby certified that error appears in the above numbered patent requiring correction and that the said Letters Patent should read as corrected below.

Column 5, line 50, for "and", second occurrence, read -- carriage --.

Signed and sealed this 29th day of May 1962.

(SEAL)
Attest:

ERNEST W. SWIDER
Attesting Officer

DAVID L. LADD
Commissioner of Patents